US006321197B1

(12) United States Patent
Kushner et al.

(10) Patent No.: US 6,321,197 B1
(45) Date of Patent: Nov. 20, 2001

(54) COMMUNICATION DEVICE AND METHOD FOR ENDPOINTING SPEECH UTTERANCES

(75) Inventors: William M. Kushner, Arlington Heights; Audrius Polikaitis, Lemont, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/235,952

(22) Filed: Jan. 22, 1999

(51) Int. Cl.[7] .................................................... G10L 15/04

(52) U.S. Cl. .......................... 704/270; 704/253; 704/248; 704/246; 704/251

(58) Field of Search ..................................... 704/270, 253

(56) References Cited

U.S. PATENT DOCUMENTS

| | | | | |
|---|---|---|---|---|
| 4,821,325 | * | 4/1989 | Martin et al. | 381/46 |
| 4,945,566 | * | 7/1990 | Mergel et al. | 381/41 |
| 5,023,911 | * | 6/1991 | Gerson | 381/43 |
| 5,682,464 | * | 10/1997 | Sejnoha | 395/2.47 |
| 5,829,000 | * | 10/1998 | Huang et al. | 704/252 |
| 5,884,258 | * | 3/1999 | Rozak et al. | 704/251 |
| 5,899,976 | * | 5/1999 | Rozak | 704/270 |
| 6,003,004 | * | 12/1999 | Hershkovits et al. | 704/253 |
| 6,029,130 | * | 2/2000 | Ariyoshi | 704/248 |
| 6,134,524 | * | 10/2000 | Peters et al. | 704/233 |
| 6,216,103 | * | 4/2001 | Wu et al. | 704/253 |

OTHER PUBLICATIONS

Qiang et al, "On Prefiltering and Endpoint Detection of Speech Signal", Proceedings of ICSP 1998, pp749–752.*

Zhang et al,"A Robust and Fast Endpoint Detection Algorithm for Isolated Word Recognition", 1997 IEEE ICIPS, pp1819–1822.*

Taboada et al,"Explicit Estimation of Speech Boundaries", IEE 1994.*

Dermates, "Fast Endpoint Detection Algorithm for Isolated Word Recognition in Office Environment", 1991, IEEE, pp 733–736.*

Ying et al,"Endpoint Detection of Isolated Utterances based on a Modified Teager Energy Measurement", 1993 IEEE, 732–735.*

Explicit Estimation of Speech Boundaries, Jaboada et al., IEE Proc. Sci. Mens. Techno;. vol. 141, No. 3, May 1994.

Fast Endpoint Detection Algorithm for Isolated Word Recognition in Office Environment, E. Dermatas et al., CH2977–7/91/0000–0733, 1991 IEEE.

Comparison of Energy–Based Endpoint Detectors for Speech Signal Processing. A Ganapathiraju et al., 0–7803–3088–9/96 1996 IEEE.

A Robust and Fast Endpoint Detection Algorithm for Isolated Word Recognition, Y. Zhang et al., 1997 IEEE International Conference on Intelligent Processing Systems, Oct. 28–31, Beijing, China.

* cited by examiner

*Primary Examiner*—Fan Tsang
*Assistant Examiner*—Michael N Opsasnick
(74) *Attorney, Agent, or Firm*—Brian M. Mancini

(57) ABSTRACT

A communication device capable of endpointing speech utterances includes a microprocessor (110) connected to communication interface circuitry (115), memory (120), audio circuitry (130), an optional keypad (140), a display (150), and a vibrator/buzzer (160). Audio circuitry (130) is connected to microphone (133) and speaker (135). Microprocessor (110) includes a speech/noise classifier and speech recognition technology. Microprocessor (110) analyzes a speech signal to determine speech waveform parameters within a speech acquisition window. Microprocessor (110) compares the speech waveform parameters to determine the start and end points of the speech utterance. Microprocessor (110) starts at a frame index based on the energy centroid of the speech utterance and analyzes the frames preceding and following the frame index to determine the endpoints. When a potential endpoint is identified, microprocessor (110) compares the cumulative energy to the total energy of the speech acquisition window to determine whether additional speech frames are present. Accordingly, gaps and pauses in the utterance will not result in an erroneous endpoint determination.

31 Claims, 2 Drawing Sheets

COMMUNICATION DEVICE AND METHOD FOR ENDPOINTING SPEECH UTTERANCES

FIELD OF THE INVENTION

The present invention relates generally to electronic devices with speech recognition technology. More particularly, the present invention relates to portable communication devices having speaker dependent speech recognition technology.

BACKGROUND OF THE INVENTION

As the demand for smaller, more portable electronic devices grows, consumers want additional features that enhance and expand the use of portable electronic devices. These electronic devices include compact disc players, two-way radios, cellular telephones, computers, personal organizers, speech recorders, and similar devices. In particular, consumers want to input information and control the electronic device using voice communication alone. It is understood that voice communication includes speech, acoustic, and other non-contact communication. With voice input and control, a user may operate the electronic device without touching the device and may input information and control commands at a faster rate than a keypad. Moreover, voice-input-and-control devices eliminate the need for a keypad and other direct-contact input, thus permitting even smaller electronic devices.

Voice-input-and-control devices require proper operation of the underlying speech recognition technology. Basically, speech recognition technology analyzes a speech waveform within a speech data acquisition window for matching the waveform to word models stored in memory. If a match is found between the speech waveform and a word model, the speech recognition technology provides a signal to the electronic device identifying the speech waveform as the word associated with the word model.

A word model is created generally by storing parameters derived from the speech waveform of a particular word in memory. In speaker independent speech recognition devices, parameters of speech waveforms of a word spoken by a sample population of expected users are averaged in some manner to create a word model for that word. By averaging speech parameters for the same word spoken by different people, the word model should be usable by most if not all people.

In speaker dependent speech recognition devices, the user trains the device by speaking the particular word when prompted by the device. The speech recognition technology then creates a word model based on the input from the user. The speech recognition technology may prompt the user to repeat the word any number of times and then average the speech waveform parameters in some manner to create the word model.

To properly operate speech recognition technology, it is important to consistently identify the start and end endpoints of the speech utterances. Inconsistently identified endpoints may truncate words and may include extraneous noises within the speech waveform acquired by the speech recognition technology. Truncated words and/or noises may result in poorly trained models and cause the speech recognition technology not to work properly when the acquired speech waveform does not match any word model. In addition, truncated words and noises may cause the speech recognition technology to misidentify the acquired speech waveform as another word. In speaker dependent speech recognition devices, problems due to poor endpointing are aggravated when the speech recognition technology permits only a few training utterances.

The prior art describe techniques using threshold energy comparisons, zero crossings analysis, and cross correlation. These methods sequentially analyze speech features from left to right, right to left, or center outwards of the speech waveform. In these techniques, utterances containing pauses or gaps are problematic. Typically, pauses or gaps in an utterance are caused by the nature of the word, the speaking style of the user, and by utterances containing multiple words. Some techniques truncate the word or phrase at the gap, assuming erroneously that the endpoint has been reached. Other techniques use a maximum gap size criteria to combine detected parts of utterances with pauses into a single utterance. In such techniques, a pause longer than a predetermined threshold can cause parts of the utterance to be excluded.

Accordingly, there is a need to consistently identify the start and end endpoints of a complete speech utterance within a speech acquisition window. There also is a need to ensure words or parts of words separated by pauses or gaps in the utterance are completely included within the utterance boundaries.

SUMMARY OF THE INVENTION

The primary object of the present invention is to provide a communication device and method for endpointing speech utterances. Another object of the present invention is to ensure that words and parts of words separated by gaps and pauses are included in the utterance boundaries. As discussed in greater detail below, the present invention overcomes the limitations of the existing art to achieve these objects and other benefits.

The present invention provides a communication device capable of endpointing speech utterances and including words and parts of words separated by gaps and pauses in the utterance boundaries. The communication device includes a microprocessor connected to communication interface circuitry, audio circuitry, memory, an optional keypad, a display, and a vibrator/buzzer. The audio circuitry is connected to a microphone and a speaker. The audio circuitry includes filtering and amplifying circuitry and an analog-to-digital converter. The microprocessor includes a speech/noise classifier and speech recognition technology.

The microprocessor analyzes a speech signal to determine speech waveform parameters within a speech acquisition window. The microprocessor utilizes the speech waveform parameters to determine the start and end points of the speech utterance. To make this determination, the microprocessor starts at a frame index based on the energy centroid of the speech utterance and analyzes the frames preceding and following the frame index to determine the endpoints. When a potential endpoint is identified, the microprocessor compares the cumulative energy at the potential endpoint to the total energy of the speech acquisition window to determine whether additional speech frames are present. Accordingly, gaps and pauses in the utterance will not result in an erroneous endpoint determination.

BRIEF DESCRIPTION OF THE DRAWINGS

The present invention is better understood when read in light of the accompanying drawings, in which.

DETAILED DESCRIPTION OF THE INVENTION

Figure 1:
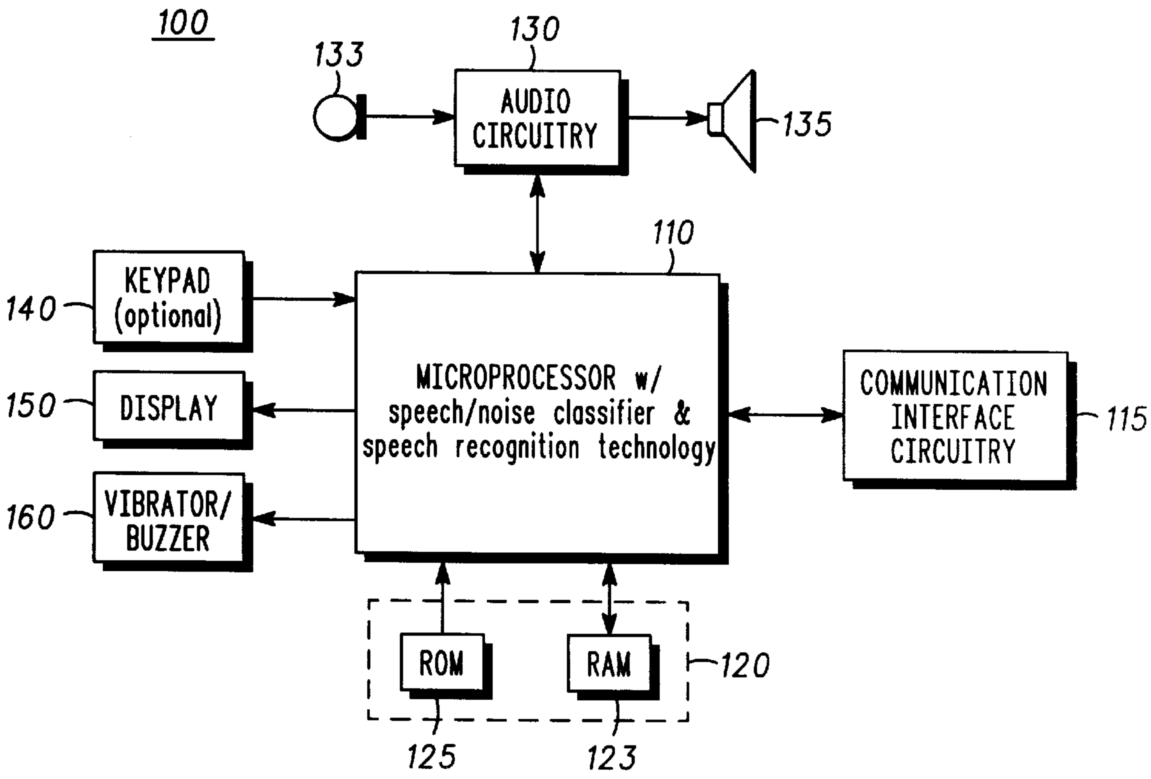
FIG. 1 is a block diagram of a communication device capable of endpointing speech utterances.

FIG. 1 is a block diagram of a communication device 100 according to the present invention. Communication device 100 may be a cellular telephone, a portable telephone handset, a two-way radio, a data interface for a computer or personal organizer, or similar electronic device. Communication device 100 includes microprocessor 110 connected to communication interface circuitry 115, memory 120, audio circuitry 130, keypad 140, display 150, and vibrator/buzzer 160.

Microprocessor 110 may be any type of microprocessor including a digital signal processor or other type of digital computing engine. Preferably, microprocessor 110 includes a speech/noise classifier and speech recognition technology. One or more additional microprocessors (not shown) may be used to provide the speech/noise classifier, the speech recognition technology, and the endpointing of the present invention.

Communication interface circuitry 115 is connected to microprocessor 110. The communication interface circuitry is for sending and receiving data. In a cellular telephone, communication interface circuitry 115 would include a transmitter, receiver, and an antenna. In a computer, communication interface circuitry 115 would include a data link to the central processing unit.

Memory 120 may be any type of permanent or temporary memory such as random access memory (RAM), read-only memory (ROM), disk, and other types of electronic data storage either individually or in combination. Preferably, memory 120 has RAM 123 and ROM 125 connected to microprocessor 110.

Audio circuitry 130 is connected to microphone 133 and speaker 135, which may be in addition to another microphone or speaker found in communication device 100. Audio circuitry 130 preferably includes amplifying and filtering circuitry (not shown) and an analog-to-digital converter (not shown). While audio circuitry 130 is preferred, microphone 133 and speaker 130 may connect directly to microprocessor 110 when it performs all or part of the functions of audio circuitry 130.

Keypad 140 may be an phone keypad, a keyboard for a computer, a touch-screen display, or similar tactile input devices. However, keypad 140 is not required given the voice input and control capabilities of the present invention.

Display 150 may be an LED display, an LCD display, or another type of visual screen for displaying information from the microprocessor 110. Display 150 also may include a touch-screen display. An alternative (not shown) is to have separate touch-screen and visual screen displays.

In operation, audio circuitry 130 receives voice communication via microphone 133 during a speech acquisition window set by microprocessor 110. The speech acquisition window is a predetermined time period for receiving voice communication. The duration of the length of the speech acquisition window is constrained by the amount of available memory in memory 120. While any time period may be selected, the speech acquisition window is preferably in the range of 1 to 5 seconds.

Voice communication includes speech, other acoustic communication, and noise. The noise may be background noise and noise generated by the user including impulsive noise (pops, clicks, bangs, etc.), tonal noise (whistles, beeps, rings, etc.), or wind noise (breath, other air flow, etc.).

Audio circuitry 130 preferably filters and digitizes the voice communication prior to sending it as a speech signal to microprocessor 110. The microprocessor 110 stores the speech signal in memory 120.

Microprocessor 110 analyzes the speech signal prior to processing it with speech recognition technology. Microprocessor 110 segments the speech acquisition window into frames. While frames of any time duration may be used, a frames of equal time duration and 10 ms are preferred. For each frame, microprocessor 110 determines the frame energy using the following equation:

$$fegy_n = \sum_{i=(n-1)I}^{nI-1} X_i^2,\ n = 1, 2, \ldots, N$$

The parameter $fegy_n$ is related to the energy of a frame of sampled data. This can be the actual frame energy or some function of it. $X_i$ are speech samples. I is the number of samples in a data frame, n. N is the total number of frames in the speech acquisition window.

In addition, microprocessor 110 numbers each frame sequentially from 1 through the total number of frames, N. Although the frames may be numbered with the flow (left to right) or against the flow (right to left) of the voice waveform, the frames are preferably numbered with the flow of the waveform. Consequently, each frame has a frame number, n, corresponding to the position of the frame in the speech acquisition window.

Microprocessor 110 has a speech/noise classifier for determining whether each frame is speech or noise. Any speech/noise classifier may be used. However, the performance of the present invention improves as the accuracy of the classifier increases. If the classifier identifies a frame as speech, the classifier assigns the frame an SNflag of 1. If the classifier identifies a frame as noise, the classifier assigns the frame an SNflag of 0. SNflag is a control value used to classify the frames.

Microprocessor 110 then determines additional speech waveform parameters of the speech signal according to the following equations:

$$Nfegy_n = fegy_n - Bfegy, n = 1, 2, \ldots, N$$

The normalized frame energy, $Nfegy_n$, is the frame energy adjusted for noise. The bias frame energy, Bfegy, is an estimate of noise energy. It may be a theoretical or empirical number. It may also be measured, such as the noise in the first few frames of the speech acquisition window.

$$sumNfegy_n = \sum_{j=1}^{n} Nfegy_j,\ n = 1, 2, \ldots, N$$

The cumulative frame energy, $sumNfegy_n$, is the sum of all previous normalized frame energies up to the current frame. The total window energy is the cumulative frame energy at N, the total number of frames in the speech acquisition window.

$$icom = NINT\left(\frac{\sum_{n=1}^{N} n \cdot Nfegy_n}{\sum_{n=1}^{N} Nfegy_n}\right)$$

The parameter, icom, is the frame index of the energy centroid of the speech utterance. The speech signal may be thought of as a variable "mass" distributed along the time axis. Using the fegy parameter as the analog of mass, the position of the energy centroid is determined by the preceding equation. NINT is the nearest integer function.

$$epkindx=\{n\forall MAX(fegy_n)\}, n=1,2, \ldots, N$$

The parameter, epkindx, is the frame index of the peak energy frame.

In addition to these parameters, microprocessor 110 may determine other speech or signal related parameters that may be used to identify the endpoints of speech utterances. After the speech waveform parameters are determined, microprocessor 110 identifies the start and end endpoints of the utterance.

Figure 2:
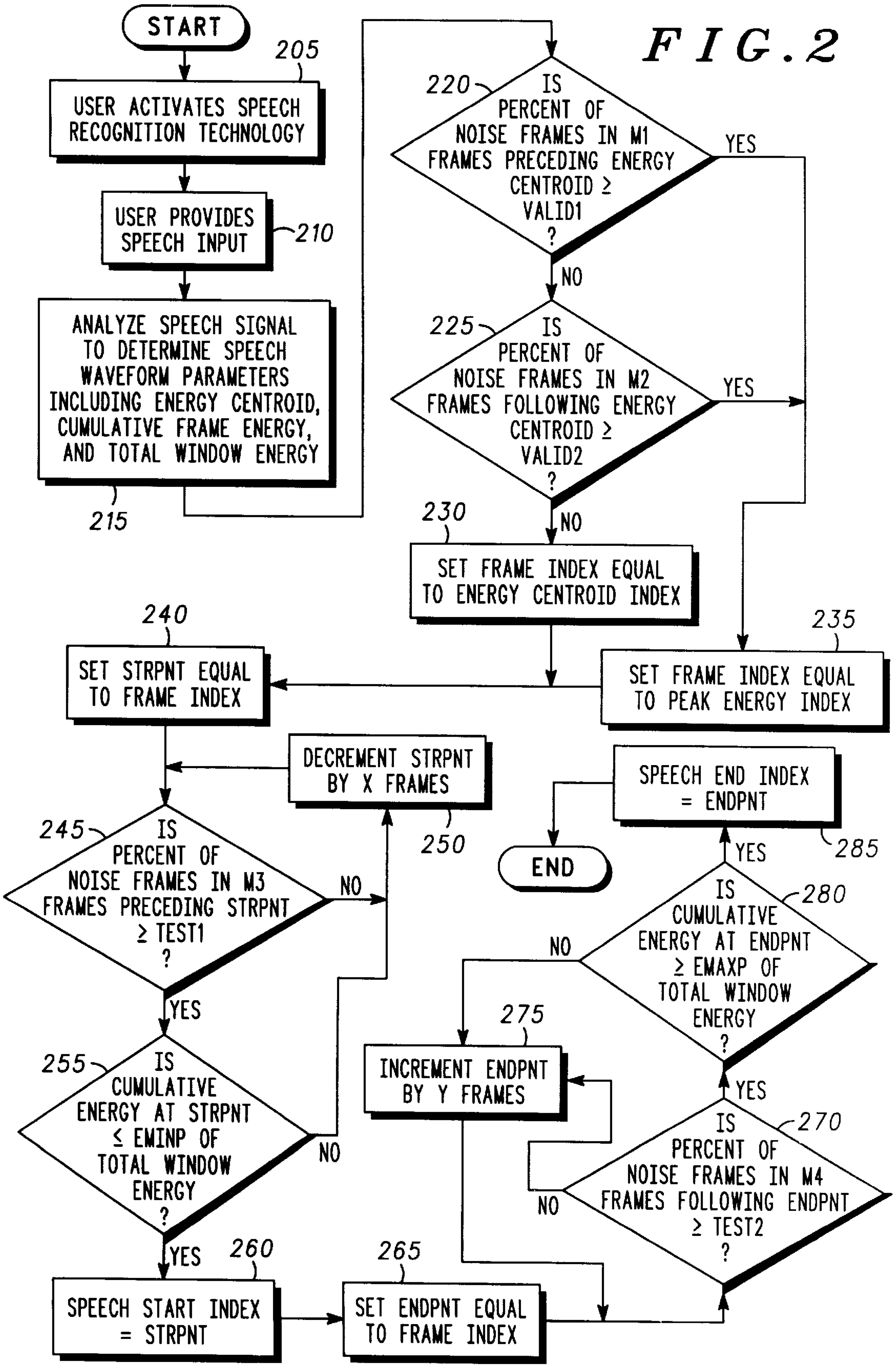
FIG. 2 is a flowchart describing endpointing speech utterances.

FIG. 2 is a flowchart describing the method for endpointing speech utterances. In step 205, the user activates the speech recognition technology, which may happen automatically when the communication device 100 is turned-on. Alternatively, the user may trigger a mechanical or electrical switch or use a voice command to activate the speech recognition technology. Once activated, microprocessor 110 may prompt the user for speech input.

In step 210, the user provides speech input into microphone 133. The start and end of the speech acquisition window may be signaled by microprocessor 110. This signal may be a beep through speaker 135, a printed or flashing message on display 150, a buzz or vibration through vibrator/buzzer 160, or similar alert.

In step 215, microprocessor 110 analyzes the speech signal to determine the speech waveform parameters previously discussed.

In steps 220 through 235, microprocessor 110 determines whether the calculated energy centroid is within a speech region of the utterance. If a certain percent of frames before or after the energy centroid are noise frames, the energy centroid may not be within a speech region of the utterance. In this situation, microprocessor 110 will use the index of the peak energy as the starting point to determine the endpoints. The peak energy is usually expected to be within a speech region of the utterance. While the percent of noise frames surrounding the energy centroid has been chosen as the determining factor, it is understood that the percent of speech frames may be used as an alternative.

In step 220, microprocessor 110 determines whether the percent of noise frames in M1 frames preceding the energy centroid is greater than or equal to Valid1. While M1 may be any number of frames, M1 is preferably in the range of 5 to 20 frames. Valid1 is the percent of noise frames preceding the centroid and indicating the energy centroid is not within a speech region. While Valid1 could be any percent including 100 percent, Valid1 is preferably in the range of 70 to 100 percent. If the percent of noise frames in M1 frames preceding the energy centroid is greater than or equal to Valid1, then the frame index is set to be equal to the peak energy index, epkindx, in step 235. If the percent of noise frames in M1 frames preceding the energy centroid is less than Valid1, then the method proceeds to step 225.

In step 225, microprocessor 110 determines whether the percent of noise frames in M2 frames following the energy centroid is greater than or equal to Valid2. While M2 may be any number of frames, M2 is preferably in the range of 5 to 20 frames. Valid2 is the percent of noise frames following the centroid and indicating the energy centroid is not within a speech region. While Valid2 could be any percent including 100 percent, Valid1 is preferably in the range of 70 to 100 percent. If the percent of noise frames in M2 frames following the energy centroid is greater than or equal to Valid2, then the frame index is set to be equal to the peak energy index, epkindx, in step 235. If the percent of noise frames in M2 frames following the energy centroid is less than Valid2, then the frame index is set in step 230 to be equal to the index of the energy centroid, icom. With the frame index set in either step 230 or 235, the method proceeds to step 240.

In steps 240 through 260, microprocessor 110 determines the start endpoint of the speech utterance. Microprocessor 110 begins at the Frame Index, basically at a position within the speech region of the utterance, and analyzes the frames preceding the Frame Index to identify a potential start endpoint. When a potential start endpoint is identified, microprocessor 110 checks whether the cumulative frame energy at the potential start endpoint is less than or equal to a percent of the total window energy. If the potential start endpoint is the start endpoint of the utterance, the cumulative frame energy at that frame should be very little if any. The cumulative frame energy at the potential start endpoint indicates whether additional speech frames are present. In this manner, gaps and pauses in the utterance will not result in a erroneous start endpoint determination.

In step 240, microprocessor 110 sets STRPNT equal to the Frame Index. STRPNT is the frame being tested as the start endpoint. While STRPNT is equal to the Frame Index initially, microprocessor 110 will decrement STRPNT until the start endpoint is found.

In step 245, microprocessor 110 determines whether the percent of noise frames in M3 frames preceding the STRPNT is greater than or equal to Test1. While M3 may be any number of frames, M3 is preferably in the range of 5 to 20 frames. Test1 is the percent of noise frames indicating STRPNT is an endpoint. While Test1 could be any percent including 100 percent, Test1 is preferably in the range of 70 to 100 percent.

If the percent of noise frames in M3 frames preceding the energy centroid is less than Test1, then STRPNT is not at an endpoint. The method proceeds to step 250, where microprocessor 110 decrements STRPNT by X frames. X may be any number of frames, but X is preferably within the range of 1 to 3 frames. The method then continues to step 245.

If the percent of noise frames in M3 frames preceding STRPNT is greater than or equal to Test1, then STRPNT maybe the start endpoint. In step 255, microprocessor 110 determines whether the cumulative energy at STRTNP is less than or equal to a minimum percent of the total window energy, EMINP. If STRTNP is the start endpoint, then the cumlative energy at STRTNP should very little if any. If STRTNP is not the start endpoint, then the cumulative energy would indicate that additional speech frames are present. EMINP is a minimum percent of the total window energy. While EMINP may be any percent including 0 percent, EMINP is preferably within the range of 5 to 15 percent. If the cumulative energy at STRTNP is greater than EMINP of the total window energy, then STRPNT is not an endpoint. The method proceeds to step 250, where microprocessor 110 decrements STRPNT by X frames. The method then continues to step 245.

If the cumulative energy at STRTNP is less than or equal to EMINP of the total window energy, then the current value of STRPNT is the start endpoint. The method proceeds to step 260, where the speech start index is equal to the current value for STRPNT. The method continues to step 265 for microprocessor 110 to determine the end endpoint.

In steps 265 through 285, microprocessor 110 determines the end endpoint of the speech utterance. Microprocessor 110 begins at the Frame Index, basically at a position within the speech region of the utterance, and analyzes the frames following the Frame Index to identify a potential end endpoint. When a potential end endpoint is identified, microprocessor 110 checks whether the cumulative frame energy at the potential end endpoint is greater than or equal to a percent of the total window energy. If the potential end endpoint is the end endpoint of the utterance, the cumulative frame energy at that frame should be almost all if not all of the total window energy. The cumulative frame energy at such frame indicates whether additional speech frames are present. In this manner, gaps and pauses in the utterance will not result in a erroneous end endpoint determination.

In step 265, microprocessor 110 sets ENDPNT equal to the Frame Index. ENDPNT is the frame being tested as the end endpoint. While ENDPNT is equal to the Frame Index initially, microprocessor 110 will increment ENDPNT until the end endpoint is found.

In step 270, microprocessor 110 determines whether the percent of noise frames in M4 frames following ENDPNT is greater than or equal to Test2. While M4 can be any number of frames, M4 is preferably in the range of 5 to 20 frames. Test2 is the percent of noise frames indicating ENDPNT is an endpoint. While Test2 could be any percent including 100 percent, Test2 is preferably in the range of 70 to 100 percent. If the percent of noise frames in M4 frames following the energy centroid is less than Test2, then ENDPNT is not at an endpoint. The method proceeds to step 275, where microprocessor 110 increments ENDPNT by Y frames. Y may be any number of frames, but Y is preferably within the range of 1 to 3 frames. The method then continues to step 275.

If the percent of noise frames in M4 frames following ENDPNT is greater than or equal to Test2, then ENDPNT may be the end endpoint. In step 280, microprocessor 110 determines whether the cumulative energy at ENDPNT is greater than or equal to a maximum percent of the total window energy, EMAXP. If ENDPNT is the end endpoint, then the cumulative energy at ENDPNT should be greater than or equal to a percent of the total window energy. EMAXP is a maximum percent of the total window energy. While EMAXP may be any percent including 100 percent, EMAXP is preferably within the range of 80 to 100 percent. If the cumulative energy at ENDPNT is less than EMAXP of the total window energy, then ENDPNT is not at an endpoint. The method proceeds to step 275, where microprocessor 110 increments ENDPNT by Y frames. The method then continues to step 270.

If the cumulative energy at ENDPNT is greater than or equal to EMAXP of the total window energy, then the current value of ENDPNT is the end endpoint. The method proceeds to step 285, where the speech end index is equal to the current value for ENDPNT.

The present invention has been described in connection with the embodiments shown in the figures. However, other embodiments may be used and changes may be made for performing the same function of the invention without deviating from it. Therefore, it is intended in the appended claims to cover all such changes and modifications that fall within the spirit and scope of the invention. Consequently, the present invention is not limited to any single embodiment and should be construed to the extent and scope of the appended claims.

What is claimed is:

1. A communication device capable of endpointing speech utterances, comprising:

at least one microprocessor having a speech/noise classifier, wherein the at least one microprocessor analyzes a speech signal to determine speech waveform parameters within a speech acquisition window, wherein the speech waveform parameters include a cumulative frame energy, an energy centroid of the speech waveform, and a total window energy, wherein the at least one microprocessor identifies a potential endpoint by analyzing frames in the speech acquisition window in relation to the energy centroid, and wherein the at least one microprocessor validates the potential endpoint is an endpoint by comparing the cumulative frame energy at the potential endpoint to the total window energy; and a microphone for providing the speech signal to the at least one microprocessor.

2. A communication device capable of endpointing speech utterances according to claim 1, further comprising at least one communication output mechanism.

3. A communication device capable of endpointing speech utterances according to claim 2, wherein the at least one communication output mechanism is a speaker.

4. A communication device capable of endpointing speech utterances according to claim 2, wherein the at least one communication output mechanism is a display.

5. A communication device capable of endpointing speech utterances according to claim 1, wherein the at least one microprocessor validates the energy centroid is within a speech region of the data acquisition window.

6. A communication device capable of endpointing speech utterances according to claim 1, further comprising:

audio circuitry operatively connected to the microphone and the at least one microprocessor, the audio circuitry having an analog-to-digital converter.

7. A communication device capable of endpointing speech utterances according to claim 1, further comprising a memory operatively connected to the at least one microprocessor.

8. A communication device capable of endpointing speech utterances according to claim 1, wherein the at least one microprocessor has speech recognition technology, and wherein the at least one microprocessor uses the speech recognition technology to produce a speech recognition signal from the speech signal.

9. A communication device capable of endpointing speech utterances according to claim 8, further comprising:

communication interface circuitry operatively connected to receive the speech recognition signal from the at least one microprocessor.

10. A method for endpointing speech utterances, wherein the speech utterances have a start endpoint and an end endpoint, comprising the steps of:

(a) analyzing a speech signal to determine speech waveform parameters within a speech acquisition window, wherein the speech waveform parameters include a cumulative frame energy, an energy centroid of the speech waveform, and a total window energy;

(b) identifying a potential start endpoint by analyzing frames in the speech acquisition window that precede the energy centroid; and (c) validating the potential start endpoint is the start endpoint by comparing the cumulative frame energy at the potential start endpoint to the total window energy.

11. A method for endpointing speech utterances according to claim 10, wherein step (b) comprises the substep (b1) analyzing frames for noise.

12. A method for endpointing speech utterances according to claim 10, wherein step (b) comprises the substep (b1) analyzing frames for speech.

13. A method for endpointing speech utterances according to claim 10, further comprising the step of:

(d) repeating steps (b) and (c) when the cumulative frame energy for the potential start endpoint is greater than a predetermined percent of the total window energy.

14. A method for endpointing speech utterances according to claim 10, further comprising the step of:

(d) identifying a potential end endpoint by analyzing frames in the speech acquisition window that follow the energy centroid; and (e) validating the potential end endpoint is the end endpoint by comparing the cumulative frame energy at the potential end endpoint to the total window energy.

15. A method for endpointing speech utterances according to claim 14, wherein step (d) comprises the substep (d1) analyzing frames for noise.

16. A method for endpointing speech utterances according to claim 14, wherein step (d) comprises the substep (d1) analyzing frames for speech.

17. A method for endpointing speech utterances according to claim 14, further comprising the step of:

(f) repeating steps (b) and (c) when the cumulative frame energy for the potential start endpoint is greater than a first predetermined percent of the total window energy; and (g) repeating steps (d) and (e) when the cumulative frame energy for the potential end endpoint is less than a second predetermined percent of the total window energy.

18. A method for endpointing speech utterances according to claim 17, wherein step (a) comprises the substep of (a1) validating the energy centroid is within a speech region of the speech acquisition window.

19. A method for endpointing speech utterances according to claim 18, wherein substep (a1) comprises the intermediate steps of:

analyzing frames preceding the energy centroid, and analyzing frames following the energy centroid.

20. A method for endpointing speech utterances according to claim 19, wherein the intermediate steps comprise analyzing for noise.

21. A method for endpointing speech utterances according to claim 19, wherein the intermediate steps comprise analyzing for speech.

22. A method for endpointing speech utterances according to claim 10, wherein step (a) comprises the substep of (a1) validating the energy centroid is within a speech region of the speech acquisition window.

23. A method for endpointing speech utterances according to claim 14, wherein step (a) comprises the substep of (a1) validating the energy centroid is within a speech region of the speech acquisition window.

24. A radiotelephone, comprising:

at least one microprocessor for endpointing speech utterances, wherein the speech utterances have a start endpoint and an end endpoint, the at least one microprocessor having a speech/noise classifier, wherein the at least one microprocessor analyzes a speech signal to determine speech waveform parameters within a speech acquisition window, wherein the speech waveform parameters include a cumulative frame energy, an energy centroid of the speech waveform, and a total window energy, wherein the at least one microprocessor validates the energy centroid is within a speech region of the speech acquisition window, wherein the at least one microprocessor identifies a potential start endpoint by analyzing frames in the speech acquisition window that precede the energy centroid, wherein the at least one microprocessor validates the potential start endpoint is the start endpoint by comparing the cumulative frame energy at the potential start endpoint to the total window energy, wherein the at least one microprocessor identifies a potential end endpoint by analyzing frames in the speech acquisition window that follow the energy centroid, wherein the at least one microprocessor validates the potential end endpoint is the end endpoint by comparing the cumulative frame energy at the potential end endpoint to the total window energy; and a microphone for providing the speech signal to the at least one microprocessor;

audio circuitry operatively connected to the microphone and at least one microprocessor, the audio circuitry having an analog-to-digital converter; and a memory operatively connected to the at least one microprocessor.

25. A radiotelephone according to claim 24, further comprising means for tactile data input.

26. A radiotelephone according to claim 25, wherein the means for tactile data input comprises a keypad.

27. A radiotelephone according to claim 24, further comprising a communication output mechanism.

28. A radiotelephone according to claim 27, wherein the communication output mechanism comprises a display.

29. A radiotelephone according to claim 27, wherein the communication output mechanism comprises a speaker.

30. A radiotelephone according to claim 24, wherein the at least one microprocessor has speech recognition technology, and wherein the at least one microprocessor uses the speech recognition technology to produce a speech recognition signal from the speech signal.

31. A radiotelephone according to claim 30, further comprising:

communication interface circuitry operatively connected to receive the speech recognition signal from the at least one microprocessor.

* * * * *